(12) United States Patent
Lee

(10) Patent No.: US 11,173,862 B2
(45) Date of Patent: Nov. 16, 2021

(54) PASSENGER AIRBAG CHUTE

(71) Applicant: HYUNDAI MOBIS Co., Ltd., Seoul (KR)

(72) Inventor: Min Kyeong Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 80 days.

(21) Appl. No.: 16/558,468

(22) Filed: Sep. 3, 2019

(65) Prior Publication Data

US 2020/0079311 A1 Mar. 12, 2020

(30) Foreign Application Priority Data

Sep. 6, 2018 (KR) .......................... 10-2018-0106407

(51) Int. Cl.
*B60R 21/215* (2011.01)

(52) U.S. Cl.
CPC .. *B60R 21/215* (2013.01); *B60R 2021/21537* (2013.01)

(58) Field of Classification Search
CPC ................... B60R 21/215; B60R 2021/21537
See application file for complete search history.

(56) References Cited

U.S. PATENT DOCUMENTS

| | | | | |
|---|---|---|---|---|
| 5,639,115 A * | 6/1997 | Kelley | ................ | B60R 21/2165 280/728.3 |
| 8,403,357 B2 * | 3/2013 | Choi | .................... | B60R 21/215 280/728.2 |
| 8,590,923 B2 * | 11/2013 | An | ........................ | B60R 21/215 280/728.3 |
| 9,010,801 B2 * | 4/2015 | Baudart | ................ | B60R 21/205 280/728.3 |
| 9,045,106 B2 * | 6/2015 | Pauthier | .................. | B29C 45/14 |
| 9,669,791 B2 * | 6/2017 | Svensson | .......... | B29C 45/14786 |
| 10,604,099 B2 * | 3/2020 | Kim | ..................... | B60R 21/205 |
| 2011/0109067 A1 * | 5/2011 | Le Hoang | ............. | B60R 21/216 280/728.3 |
| 2018/0194319 A1 * | 7/2018 | Lesnik | .................. | B60R 21/235 |

FOREIGN PATENT DOCUMENTS

| | | | | |
|---|---|---|---|---|
| JP | 6563082 B1 * | 8/2019 | .......... | B60R 21/205 |
| KR | 10-1606477 | 3/2016 | | |

* cited by examiner

*Primary Examiner* — Faye M Fleming
(74) *Attorney, Agent, or Firm* — H.C. Park & Associates, PLC

(57) ABSTRACT

Disclosed herein is a passenger airbag chute that includes a chute frame, a door plate disposed in an opening of the chute frame, a hinge allowing the door plate to be rotatably connected to the chute frame, and a screen including a frame coupling part coupled to the chute frame, a door coupling part coupled to the door plate, and a hinge coupling part formed between the frame coupling part and the door coupling part and coupled to the hinge.

15 Claims, 5 Drawing Sheets

SECTION A-A'

SECTION A-A'

PASSENGER AIRBAG CHUTE

CROSS-REFERENCE TO RELATED APPLICATION

This application claims priority from and the benefit of Korean Patent Application No. 10-2018-0106407, filed on Sep. 6, 2018, which is hereby incorporated by reference for all purposes as if set forth herein.

BACKGROUND

Field

Exemplary embodiments relate to a passenger airbag chute, and more particularly, a passenger airbag chute that guides deployment of a passenger airbag.

Discussion of the Background

In general, a passenger airbag (PAB) refers to an airbag for safety of the passenger sitting on a seat next to a driver's seat. The passenger airbag is a safety device for preventing a part of the body, such as the knees, head, or chest, of the passenger sitting on a passenger seat from directly hitting an instrument panel, a windshield, or the like in the event of a vehicle collision.

The chute of the passenger airbag is installed inside the instrument panel, including a chute frame, a door plate disposed in the opening of the chute frame, and a hinge part for rotatably connecting the door plate to the chute frame. The passenger airbag disposed inside the instrument panel is deployed toward a passenger by tearing an instrument through the chute of the passenger airbag in the event of a vehicle collision.

It is difficult for the conventional passenger airbag chute to reliably implement that the door plate is stably tilted about the hinge part because the door plate or the hinge part is excessively deformed or damaged by the deployment pressure of the airbag.

Therefore, it is necessary to improve this issue.

The above information disclosed in this Background section is only for enhancement of understanding of the background of the invention and, therefore, it may contain information that does not constitute prior art.

SUMMARY

Exemplary embodiments of the present invention provide a passenger airbag chute capable of further enhancing reliability in quality while stably realizing performance for guiding deployment of an airbag.

Additional features of the invention will be set forth in the description which follows, and in part will be apparent from the description, or may be learned by practice of the invention.

An exemplary embodiment of the present invention discloses a passenger airbag chute that includes a chute frame, a door plate disposed in an opening of the chute frame, a hinge allowing the door plate to be rotatably connected to the chute frame, and a screen including a frame coupling part coupled to the chute frame, a door coupling part coupled to the door plate, and a hinge coupling part formed between the frame coupling part and the door coupling part and coupled to the hinge.

The chute frame may include a frame fusion rib protruding toward and joined to a crash pad, and the door plate may include a door fusion rib protruding toward and joined to the crash pad.

The door plate may include connectors formed at a position spaced apart from the hinge and connected to the chute frame, the connectors being broken by deployment pressure of an airbag.

The hinge may have flexibility so as to be flexibly bent by deployment pressure of an airbag.

The hinge may be formed integrally with the chute frame and the door plate by injection molding, and may be relatively thinner than the chute frame and the door plate.

The screen may be made of a fabric material, and may be joined integrally with the chute frame, the door plate, and the hinge by insert injection molding.

The screen may be configured such that at least one of the frame coupling part, the door coupling part, and the hinge coupling part is exposed out of the chute frame, the door plate, and the hinge.

The frame coupling part may include a frame reinforcing portion positioned inside the chute frame and a first exposed portion formed continuously with the frame reinforcing portion and exposed out of the chute frame.

The door coupling part may include a door reinforcing portion positioned inside the door plate, and a second exposed portion formed continuously with the door reinforcing portion and exposed out of the door plate.

The hinge coupling part may include One or more composite hinge portions coupled to the hinge to reinforce rigidity of the hinge, and One or more screen hinge portions formed continuously with the composite hinge portion and disposed in parallel with the hinge to rotatably support the door plate.

The hinge coupling part may include One or more composite hinge portions coupled to the hinge to reinforce rigidity of the hinge, and One or more hollow hinge portions formed to be hollow between the frame coupling part and the door coupling part.

One end of the screen may be positioned on the bottom of the chute frame, an intermediate portion of the screen may be positioned on an upper surface of the hinge, and the other end of the screen may be positioned on the bottom of the door plate.

As apparent from the above description, in the passenger airbag chute according to the present invention, the screen is coupled continuously to the frame coupling part, the door coupling part, and the hinge. Therefore, the passenger airbag chute can stably secure not only the coupling force with the chute frame and the door plate, but also the combined rigidity at the coupling portion with the hinge together with the hinge.

Accordingly, according to the passenger airbag chute of the present invention, it is possible to prevent the door plate and the hinge from being excessively deformed or broken due to the deployment pressure of the airbag and to stably realize the performance for guiding the deployment of the airbag while the door plate is reliably rotated. In addition, it is possible to further enhance reliability in quality.

Furthermore, in the passenger airbag chute of the present invention, at least one of one end, the other end, and the intermediate portion of the screen in the extending direction thereof is exposed. Therefore, on the basis of the exposed portion, it is possible to more clearly check the coupling position and state of the screen in each product and thus to enhance the structural stability and manufacturing reliability of the passenger airbag chute according to the present invention.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
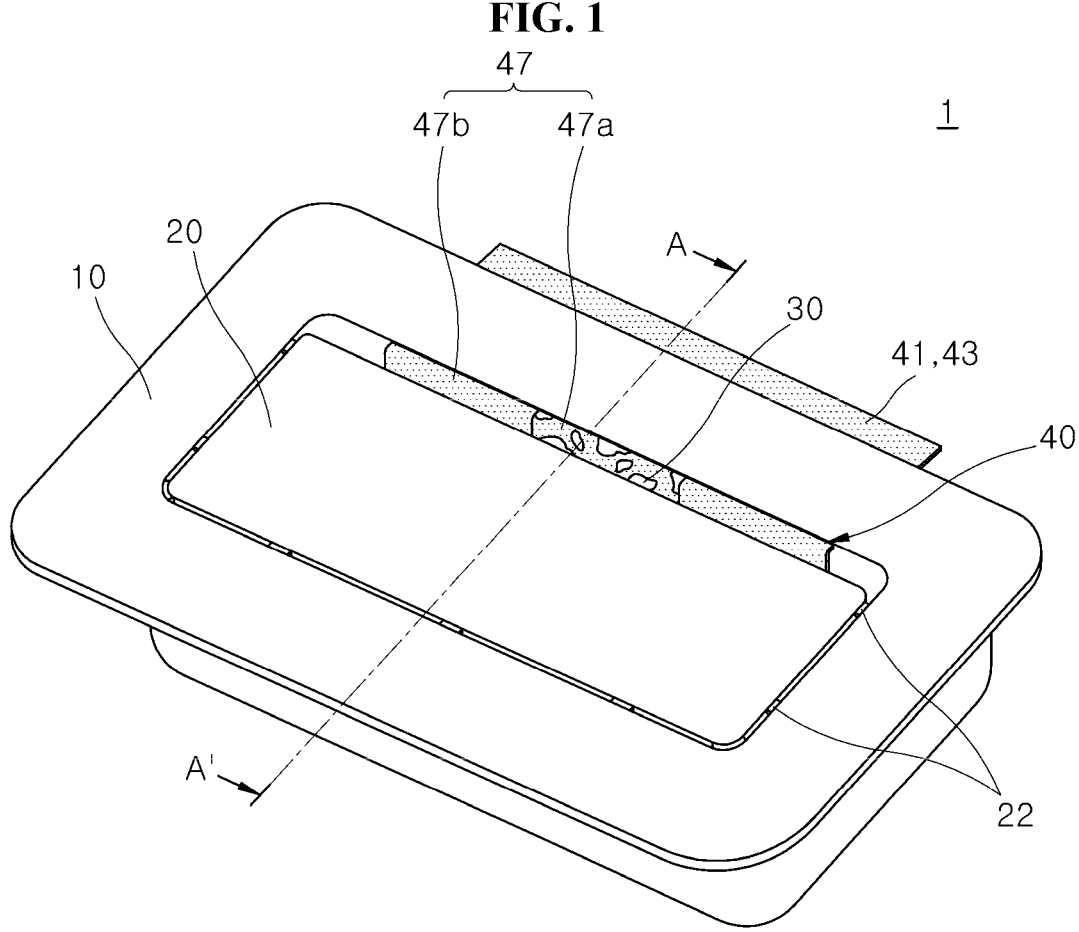
FIG. 1 is a perspective view illustrating a passenger airbag chute according to an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in more detail with reference to the accompanying drawings.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
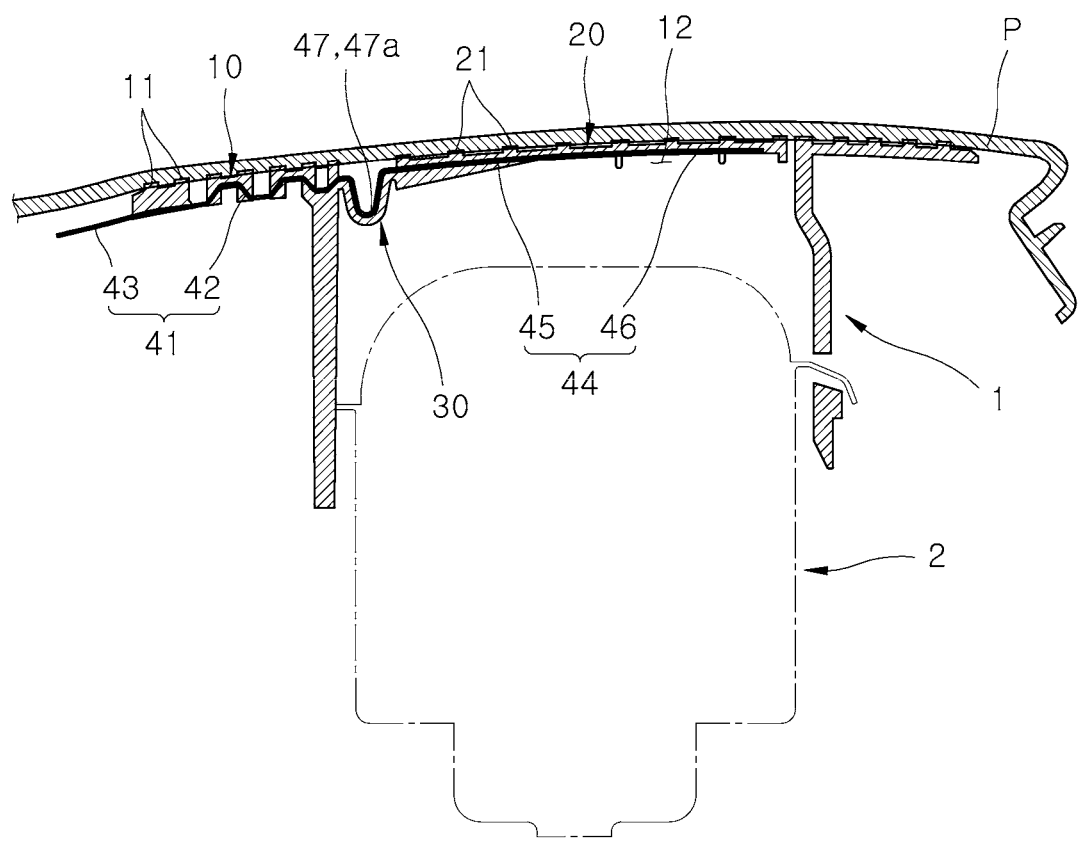
FIG. 2 is a cross-sectional view taken along line A-A' of FIG. 1.

FIG. 1 is a perspective view illustrating a passenger airbag chute according to an embodiment of the present invention. FIG. 2 is a cross-sectional view taken along line A-A' of FIG. 1.

Referring to FIGS. 1 and 2, the passenger airbag chute, which is designated by reference numeral 1, according to the embodiment of the present invention includes a chute frame 10, a door plate 20, a hinge 30, and a screen 40.

The chute frame 10 has a frame shape and is fused to the inner surface of a crash pad P (see FIG. 2). The chute frame 10 has a frame fusion rib 11 formed at the joint thereof with the crash pad P, and the frame fusion rib 11 protrudes toward the crash pad P. The frame fusion rib 11 is fused and coupled to the crash pad P. The chute frame 10 has a hollow opening 12 formed in the intermediate portion thereof so that an airbag 2 may be deployed through the opening 12.

The door plate 20 is disposed in the opening 12 of the chute frame 10. The door plate 20 has a door fusion rib 21 formed at the joint thereof with the crash pad P, and the door fusion rib 21 protrudes toward the crash pad P. The door fusion rib 21 is fused and coupled to the crash pad P. One side of the door plate 20 is rotatably connected to the chute frame 10 by the hinge 30. The door plate 20 has connectors 22 formed over a plurality of points at the other side thereof spaced apart from the hinge 30, and the connectors 22 are connected to the chute frame 10. When the airbag 2 is deployed, the connectors 22 are broken by the deployment pressure of the airbag 2.

The hinge 30 allows the door plate 20 to be rotatably connected to the chute frame 10. The hinge 30 has flexibility so as to be flexibly warped and bent by the deployment pressure of the airbag 2. The hinge 30 is manufactured integrally with the chute frame 10 and the door plate 20 by plastic injection molding, and is relatively thinner than the chute frame 10 and the door plate 20, so that the hinge 30 may have flexibility.

When the airbag 2 is operated, the deployment pressure of the airbag 2 acts on the door plate 20 so that the door plate 20 rotates about the hinge 30 as the connectors 22 are broken. The airbag 2 is deployed toward a passenger through the opening 12 opened by the door plate 20 moves as above, thereby protecting the passenger.

The screen 40 serves to further improve the rigidity and operational reliability of the hinge 30. The screen 40 is made of a fabric material and extends over the chute frame 10, the door plate 20, and the hinge 30. The screen 40 is coupled and joined integrally with the chute frame 10, the door plate 20, and the hinge 30 by injection molding the chute frame 10, the door plate 20, and the hinge 30 with the screen 40 inserted into a mold.

The screen 40 may be made of a fabric material such as synthetic fiber which is a mesh fabric woven with warp and weft and has excellent mechanical properties. Thus, the screen 40 may stably implement the function of rotatably supporting the door plate 20 in a state in which it overlaps with the hinge 30 in multiple layers without hindering the flexibility of the hinge 30.

Figure 3:
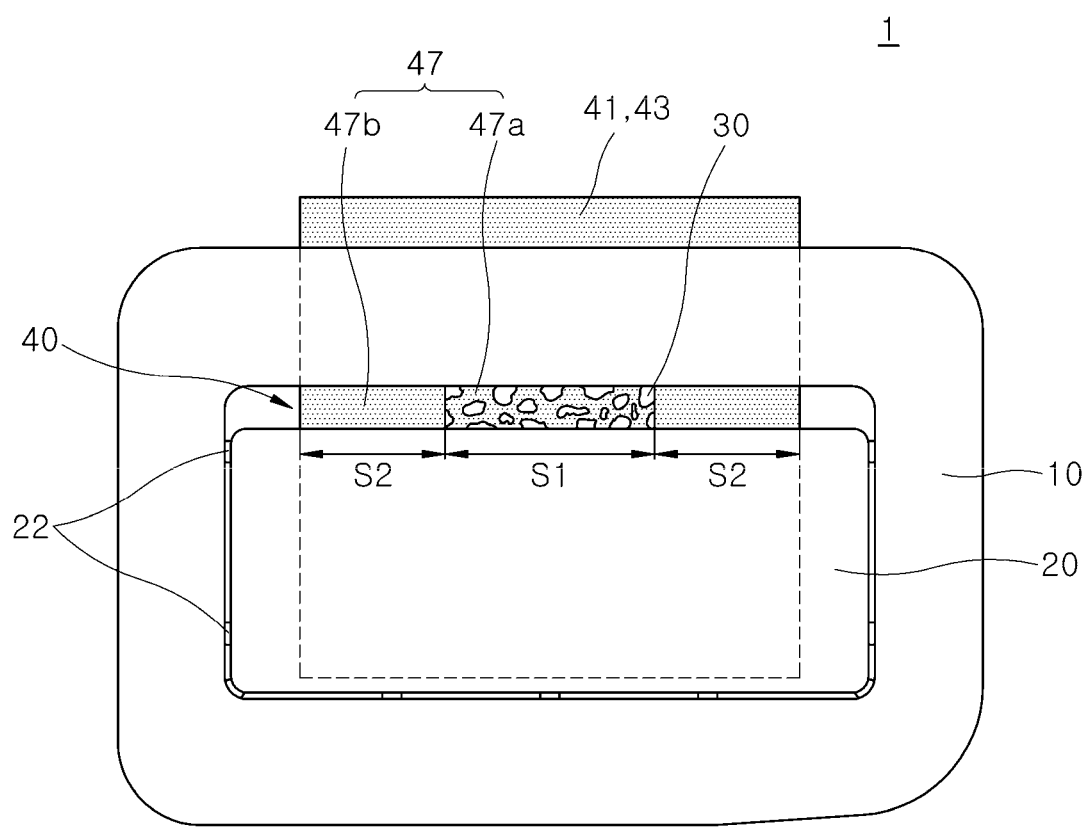
FIG. 3 is a top view of FIG. 1.
Figure 4:
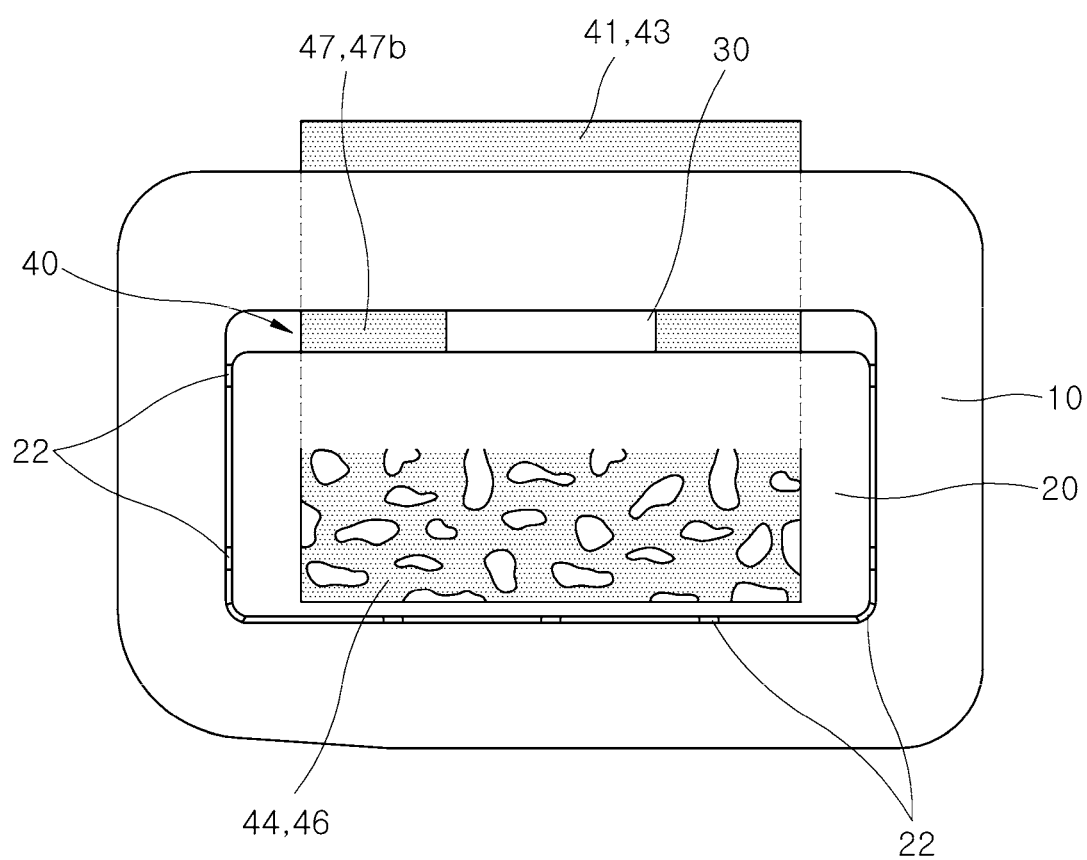
FIG. 4 is a bottom view of FIG. 1.

FIG. 3 is a top view of FIG. 1. FIG. 4 is a bottom view of FIG. 1.

Referring to FIGS. 3 and 4, the screen 40 according to the embodiment of the present invention includes a frame coupling part 41, a door coupling part 44, and a hinge coupling part 47. The frame coupling part 41 is a part coupled to the chute frame 10, the door coupling part 44 is a part coupled to the door plate 20, and the hinge coupling part 47 is a part coupled to the hinge 30 between the frame coupling part 41 and the door coupling part 44. The frame coupling part 41, the door coupling part 44, and the hinge coupling part 47 are made of a single continuous fabric material.

The screen 40 is formed by insert injection molding such that at least a portion thereof is exposed out of the chute frame 10, the door plate 20, and the hinge 30. That is, at least one of the frame coupling part 41, the door coupling part 44, and the hinge coupling part 47 is manufactured so as to be checked with the naked eye. Accordingly, in mass production, it is possible to more constantly maintain the coupling position and state of the screen 40 in each product on the basis of the part checked with the naked eye.

The screen 40 according to the embodiment of the present invention has a structure in which the frame coupling part 41, the door coupling part 44, and the hinge coupling part 47 are disposed to be exposed out of the chute frame 10, the door plate 20, and the hinge 30, respectively.

The frame coupling part 41 according to the embodiment of the present invention includes a frame reinforcing portion 42 and a first exposed portion 43. The frame reinforcing portion 42 is positioned inside the chute frame 10. One side of the screen 40 may be securely coupled to the chute frame 10 by the frame reinforcing portion 42. The first exposed portion 43 is formed continuously with the frame reinforcing portion 42, and extends out of and is thus exposed out of the chute frame 10.

The door coupling part 44 according to the embodiment of the present invention includes a door reinforcing portion 45 and a second exposed portion 46. The door reinforcing portion 45 is positioned inside the door plate 20. Both surfaces of the other side of the screen 40 may be securely coupled to the door plate 20 by the door reinforcing portion 45. The second exposed portion 46 is formed continuously with the door reinforcing portion 45, and is disposed on the bottom of and thus exposed out of the door plate 20. In this case, one surface of the second exposed portion 46 is coupled and joined to the door plate 20.

The hinge coupling part 47 according to the embodiment of the present invention has a larger width than the hinge 30, and includes a composite hinge portion 47a coupled to the hinge 30 and screen hinge portions 47b which are not coupled to the hinge 30. That is, the screen hinge portions 47b are clearly exposed out of the hinge 30. Referring to FIGS. 2 and 3, the composite hinge portion 47a according to the embodiment of the present invention is disposed on the upper surface of the hinge 30 to be more clearly exposed out of the hinge 30.

The coupling positions of the first exposed portion 43, the second exposed portion 46, and the hinge coupling part 47 corresponding to one end, the other end, and the intermediate portion of the screen 40 may be checked with the naked eye. Thus, on the basis of the exposed portion, it is possible to more clearly check the coupling position and state of the screen 40 in each product. Therefore, it is possible to enhance the structural stability and manufacturing reliability of the passenger airbag chute 1 according to the present invention.

In addition, when one end, the intermediate portion, and the other end of the screen 40 are positioned on the bottom of the chute frame 10, on the upper surface of the hinge 30, and on the bottom of the door plate 20, respectively, the screen 40 has more various directions relative to the chute frame 10, the door plate 20 and the hinge 30, compared to when all portions of the screen 40 are positioned in the intermediate portions, or on the upper surfaces, or on the bottoms of the chute frame 10, the door plate 20, and the hinge 30. Therefore, it is possible to more stably secure combined rigidity and tensile rigidity by insert injection molding.

The composite hinge portion 47a is continuously formed between the frame coupling part 41 and the door coupling part 44, and is coupled to the hinge 30 to reinforce the rigidity of the hinge 30. Thus, the composite hinge portion 47a implements the combined rigidity together with the hinge 30. The screen hinge portions 47b are not coupled to the hinge 30 between the frame coupling part 41 and the door coupling part 44, but is disposed alone. More specifically, the screen hinge portions 47b are disposed in parallel with the composite hinge portion 47a and the hinge 30 with respect to the width direction of the hinge 30. Thus, the screen hinge portions 47b implement a hinge function only by the properties of the material constituting the screen 40.

By the hinge coupling part 47, the hinge coupling part 47 has a structure in which a composite hinge section S1, in which the hinge 30 and the composite hinge portion 47a implement the combined rigidity, and a single screen hinge section S2, in which the screen 40 implements the rigidity alone, are continuously arranged. According to the present invention, the hinge 30 and the hinge coupling part 47 can secure the rigidity capable of securely supporting the door plate 20 over the composite hinge section S1 and the single screen hinge section S2.

Therefore, it is possible to prevent the door plate 20 and the hinge 30 from being excessively deformed or broken due to the deployment pressure of the airbag 2 and to stably realize the performance for guiding the deployment of the airbag 2 while the door plate 20 is reliably rotated. The composite hinge section S1 and the single screen hinge section S2 according to the present invention are not limited to those illustrated in FIGS. 1 to 4, and the arrangement and shapes thereof may be varied and applied in various manners depending on the width and position of the hinge 30 as well as the number of hinges and the width and shape of the screen 40.

Figure 5:
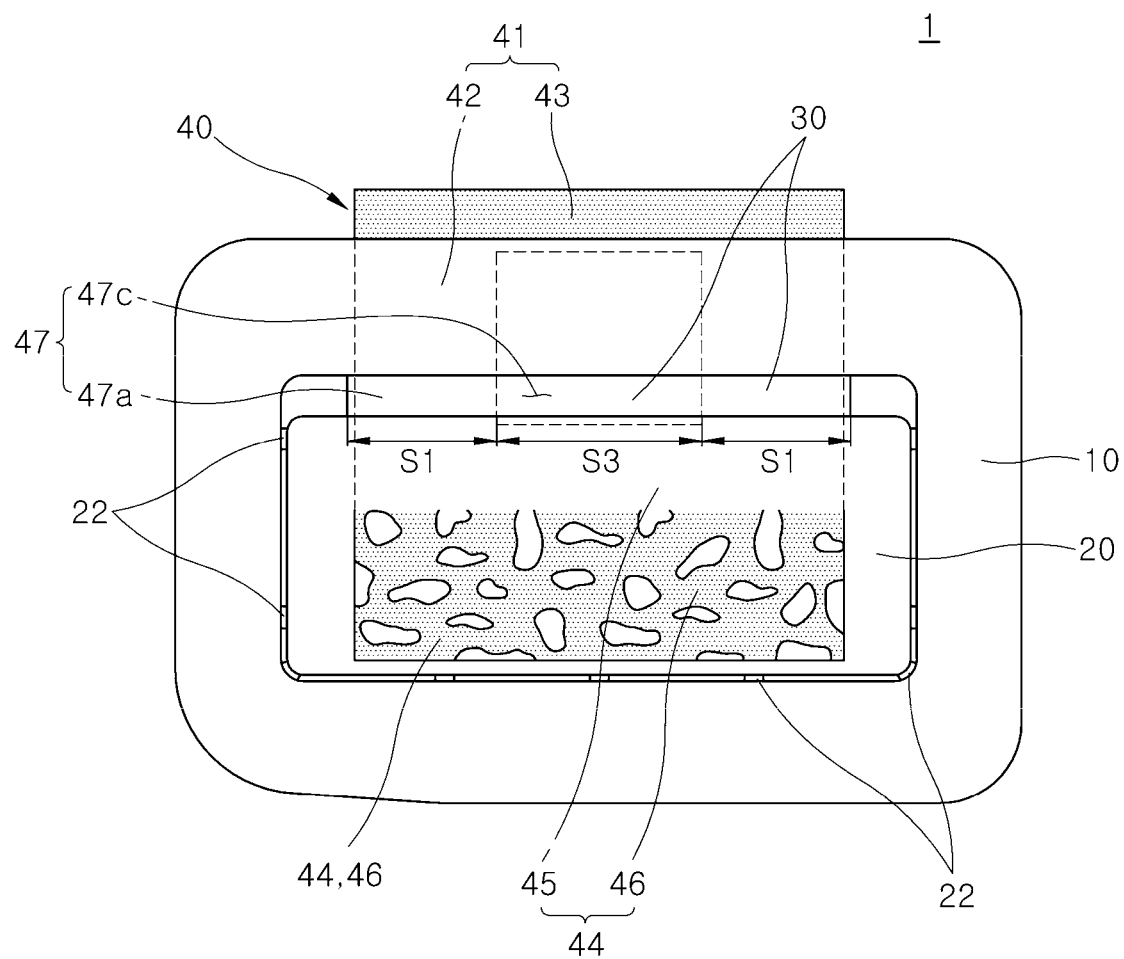
FIG. 5 is a top view illustrating a passenger airbag chute according to another embodiment of the present invention with its main part viewed transparently.

FIG. 5 is a top view illustrating a passenger airbag chute according to another embodiment of the present invention with its main part viewed transparently.

Next, another embodiment of the present invention will be described with reference to FIG. 5. In explaining the present embodiment, a detailed description of the contents overlapping with the embodiment illustrated in FIGS. 1 to 4 will be omitted.

A hinge coupling part 47 according to another embodiment of the present invention includes a composite hinge portion 47a and a hollow hinge portion 47c. The hinge coupling part 47 is continuously formed between a frame coupling part 41 and a door coupling part 44, and is coupled to a hinge 30. Thus, the composite hinge portion 47a implements the combined rigidity together with the hinge 30. The hollow hinge portion 47c is formed to be hollow between the frame coupling part 41 and the door coupling part 44. Thus, only the hinge 30 is disposed at a position corresponding to the hollow hinge portion 47c, as illustrated in FIG. 5, thereby implementing a hinge function only by the properties of the material constituting the hinge 30.

The hollow hinge portion 47c may be formed by cutting a portion of a screen 40 positioned corresponding to the hinge 30. By the hinge coupling part 47, the hinge coupling part 47 has a structure in which composite hinge sections S1, in which the hinge 30 and the composite hinge portion 47a implement the combined rigidity, and a single resin hinge section S3, in which the hinge 30 implements the rigidity alone, are continuously arranged.

According to the present invention, the hinge 30 and the hinge coupling part 47 can secure the rigidity capable of securely supporting the door plate 20 over the composite hinge section S1 and the single resin hinge section S3. Therefore, it is possible to prevent the door plate 20 and the hinge 30 from being excessively deformed or broken due to the deployment pressure of the airbag 2 and to stably realize the performance for guiding the deployment of the airbag 2 while the door plate 20 is reliably rotated. In addition, the material cost of the screen 40 can be reduced corresponding to the hollow hinge portion 47c.

The composite hinge section S1 and the single resin hinge section S3 according to the present invention are not limited to those illustrated in FIG. 5, and the arrangement and shapes thereof may be varied and applied in various manners depending on the width and position of the hinge 30 as well as the number of hinges and the width and shape of the screen 40. For example, when the hinge 30 and the screen 40 have the same width, the chute frame 10 may also be connected to the door plate 20 only by the composite hinge section S1 without the single screen hinge section S2 or the single resin hinge section S3.

According to the passenger airbag chute 1 of the present invention having the above-mentioned configuration, the screen 40 is coupled continuously to the chute frame 10, the door plate 20, and the hinge 30. Therefore, the screen 40 can stably secure not only the coupling force with the chute frame 10 and the door plate 20 but also the combined rigidity at the coupling portion with the hinge 30 together with the hinge 30.

Accordingly, according to the passenger airbag chute 1 of the present invention, it is possible to prevent the door plate 20 and the hinge 30 from being excessively deformed or broken due to the deployment pressure of the airbag 2 and to stably realize the performance for guiding the deployment of the airbag 2 as the door plate 20 is reliably rotated. In addition, it is possible to further enhance reliability in quality.

Furthermore, according to the passenger airbag chute 1 of the present invention, at least one of one end, the intermediate portion, the other end of the screen 40 in the extending direction thereof is exposed. Therefore, on the basis of the exposed portion, it is possible to more clearly check the coupling position and state of the screen 40 in each product and thus to enhance the structural stability and manufacturing reliability of the passenger airbag chute 1 according to the present invention.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. A passenger airbag chute comprising:
   a chute frame;
   a door plate disposed in an opening defined on the chute frame;
   a hinge allowing the door plate to be rotatably connected to the chute frame; and
   a screen comprising a frame coupling part coupled to the chute frame, a door coupling part coupled to the door plate, and a hinge coupling part formed between the frame coupling part and the door coupling part and coupled to the hinge,
   wherein the door plate comprises connectors formed at a position spaced apart from the hinge and connected to the chute frame, the connectors being configured to be broken by deployment pressure of an airbag.

2. The passenger airbag chute according to claim 1, wherein:
   the chute frame comprises a frame fusion rib protruding toward and joined to a crash pad; and
   the door plate comprises a door fusion rib protruding toward and connected to the crash pad.

3. The passenger airbag chute according to claim 1, wherein the hinge has flexibility to be flexibly bent by deployment pressure of an airbag.

4. The passenger airbag chute according to claim 1, wherein the hinge is formed integrally with the chute frame and the door plate by injection molding, and is thinner than the chute frame and the door plate.

5. The passenger airbag chute according to claim 1, wherein the screen is made of a fabric material, and is formed integrally with the chute frame, the door plate, and the hinge by insert injection molding.

6. A passenger airbag chute, comprising:
   a chute frame;
   a door plate disposed in an opening defined on the chute frame;
   a hinge allowing the door plate to be rotatably connected to the chute frame; and
   a screen comprising a frame coupling part coupled to the chute frame, a door coupling part coupled to the door plate, and a hinge coupling part formed between the frame coupling part and the door coupling part and coupled to the hinge, wherein the screen is configured such that at least one of the frame coupling part, the door coupling part, and the hinge coupling part is exposed out of the chute frame, the door plate, and the hinge.

7. The passenger airbag chute according to claim 1, wherein the frame coupling part comprises:
   a frame reinforcing portion positioned inside the chute frame; and
   a first exposed portion formed continuously with the frame reinforcing portion and exposed out of the chute frame.

8. The passenger airbag chute according to claim 1, wherein the door coupling part comprises:
   a door reinforcing portion positioned inside the door plate; and
   a second exposed portion formed continuously with the door reinforcing portion and exposed out of the door plate.

9. The passenger airbag chute according to claim 1, wherein the hinge coupling part comprises:
   one or more composite hinge portions coupled to the hinge to reinforce rigidity of the hinge; and
   one or more screen hinge portions formed continuously with the one or more composite hinge portions and disposed in parallel with the hinge to rotatably support the door plate.

10. The passenger airbag chute according to claim 1, wherein the hinge coupling part comprises:
    one or more composite hinge portions coupled to the hinge to reinforce rigidity of the hinge; and
    one or more hollow hinge portions formed to be hollow between the frame coupling part and the door coupling part.

11. A passenger airbag chute, comprising:
    a chute frame;
    a door plate disposed in an opening defined on the chute frame;
    a hinge allowing the door plate to be rotatably connected to the chute frame; and
    a screen comprising a frame coupling part coupled to the chute frame, a door coupling part coupled to the door plate, and a hinge coupling part formed between the frame coupling part and the door coupling part and coupled to the hinge,
    wherein:
      one end of the screen is positioned on a bottom of the chute frame;
      an intermediate portion of the screen is positioned on an upper surface of the hinge; and
      an other end of the screen is positioned on a bottom of the door plate.

12. A passenger airbag chute, comprising:
    a chute frame;
    a door plate disposed in an opening defined on the chute frame;
    a hinge allowing the door plate to be rotatably connected to the chute frame; and
    a screen comprising a frame coupling part coupled to the chute frame, a door coupling part coupled to the door plate, and a hinge coupling part formed between the frame coupling part and the door coupling part and coupled to the hinge,
    wherein the frame coupling part comprises:
      a frame reinforcing portion positioned inside the chute frame; and
      a first exposed portion formed continuously with the frame reinforcing portion and exposed out of the chute frame.

13. A passenger airbag chute, comprising:
    a chute frame;
    a door plate disposed in an opening defined on the chute frame;
    a hinge allowing the door plate to be rotatably connected to the chute frame; and
    a screen comprising a frame coupling part coupled to the chute frame, a door coupling part coupled to the door plate, and a hinge coupling part formed between the frame coupling part and the door coupling part and coupled to the hinge,
    wherein the door coupling part comprises:
      a door reinforcing portion positioned inside the door plate; and
      a second exposed portion formed continuously with the door reinforcing portion and exposed out of the door plate.

14. A passenger airbag chute, comprising:
    a chute frame;
    a door plate disposed in an opening defined on the chute frame;
    a hinge allowing the door plate to be rotatably connected to the chute frame; and
    a screen comprising a frame coupling part coupled to the chute frame, a door coupling part coupled to the door plate, and a hinge coupling part formed between the frame coupling part and the door coupling part and coupled to the hinge,
    wherein the hinge coupling part comprises:
      one or more composite hinge portions coupled to the hinge to reinforce rigidity of the hinge; and
      one or more screen hinge portions formed continuously with the one or more composite hinge portions and disposed in parallel with the hinge to rotatably support the door plate.

15. A passenger airbag chute, comprising:
    a chute frame;
    a door plate disposed in an opening defined on the chute frame;
    a hinge allowing the door plate to be rotatably connected to the chute frame; and
    a screen comprising a frame coupling part coupled to the chute frame, a door coupling part coupled to the door plate, and a hinge coupling part formed between the frame coupling part and the door coupling part and coupled to the hinge,
    wherein the hinge coupling part comprises:
      one or more composite hinge portions coupled to the hinge to reinforce rigidity of the hinge; and
      one or more hollow hinge portions formed to be hollow between the frame coupling part and the door coupling part.

* * * * *